Dec. 3, 1968     L. HEATH     3,414,340

JOURNAL BEARING ASSEMBLIES

Filed April 8, 1966     3 Sheets-Sheet 1

INVENTOR

LEONARD HEATH

Dec. 3, 1968 L. HEATH 3,414,340
JOURNAL BEARING ASSEMBLIES
Filed April 8, 1966 3 Sheets-Sheet 2

INVENTOR

LEONARD HEATH

Dec. 3, 1968 L. HEATH 3,414,340
JOURNAL BEARING ASSEMBLIES
Filed April 2, 1966 3 Sheets-Sheet 3

INVENTOR
LEONARD HEATH

United States Patent Office 3,414,340
Patented Dec. 3, 1968

3,414,340
JOURNAL BEARING ASSEMBLIES
Leonard Heath, London, England, assignor to The Glacier Metal Company Limited, Wembley, England, a British company
Filed Apr. 8, 1966, Ser. No. 541,253
Claims priority, application Great Britain, Apr. 8, 1965, 14,978/65
8 Claims. (Cl. 308—72)

ABSTRACT OF THE DISCLOSURE

The journal bearing assembly of the present invention comprises a journal member having a bearing surface, and a bearing member having an inner bearing surface formed for engagement with bearing surface of the journal member and a plurality of outer bearing surfaces. A housing surrounds but is spaced from the bearing member, said housing being provided with a plurality of inner bearing surfaces confronting the said outer bearing surfaces of the bearing member. A plurality of intermediate devices between and in sliding contact with said inner and outer bearing surfaces permitting limited angular movement of the axis of the bearing member with respect to the housing.

---

Figure 1:
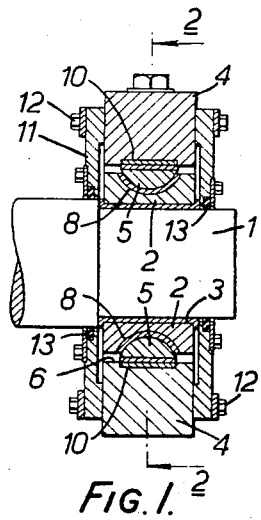

This invention relates to journal bearings of the kind which cater for a limited amount of self-alignment in order, for example, to accommodate dimensional tolerances or small dimensional errors in associated parts and/or allow for distortion of associated parts.

The invention is particularly but not exclusively applicable to journal bearings which are subject to heavy loads, such as loads of several hundred tons as are encountered in journal bearings for bascule bridges or allied applications such as the ramps employed on car ferries or bearings for tilting furnaces.

As at present in use the bearings for such structures comprise a member (hereinafter called for convenience the ball member) having an external part-spherical surface engaging a corresponding internal part-spherical surface in a socket member so that a degree of universal pivotal movement can take place between the journal and the socket member about the centre of curvature of the surfaces. It is moreover established practice to form one of the surfaces as a so-called dry lubricated surface, as by forming the surface of porous bronze impregnated with polytetrafluoroethylene in which case the co-operating bearing surface is usually nickel plated or chromium plated, or is formed of stainless steel.

Since the radius of curvature of the part-spherical surfaces may be of the order of 50 inches and the socket member on which the inner part-spherical surface is formed may weigh as much as four or five tons, it is difficult to machine the surfaces with sufficient accuracy, while moreover, where the so-called dry lubricated surface is in the form of porous bronze impregnated with P.T.F.E., this surface is usually constituted by one of the surfaces of a layer of sheet material which is usually in strip form and initially flat so that not only does it have to be shaped into the part-spherical form but slots have to be machined in the surface of the part by which the strips are supported to key them in position and this entails additional machinging operations.

Large spherical bearings of the kind referred to also require correspondingly large forces to cause relative movement between the parts under load.

It is an object of the present invention to provide a form of journal bearing assembly which will be suitable for use where spherical bearings of the kind referred to above have hitherto been used but in which the difficulties of manufacture will be reduced while the bearing assembly will permit the required relative movements more readily than the existing construction, when the load is substantially unidirectional.

Reference herein to the axis of a bearing member are to be understood as referring to the axis about which a journal member, if and when assembled so as to be in rotatable engagement with the bearing surface of the bearing member will rotate.

A journal bearing assembly according to the present invention comprises a bearing member (which may be in one or more parts) having an inner bearing surface formed for engagement by the bearing surface of a journal member, a housing surrounding but spaced from the bearing member, and a plurality of intermediate members or assemblies interposed between and having bearing surfaces in sliding engagement respectively with bearing surfaces on the bearing member and bearing surfaces on the housing so as to permit limited angular movement of the axis of the bearing member relatively to the housing.

Preferably one of the bearing surfaces of each of the intermediate members or assemblies is of arcute cross-section in planes containing the axis of the bearing member while the other may be flat.

In constructions according to the invention one of any one or more of the pairs of bearing surfaces which have relative sliding movement may be formed of a material providing a so-called dry lubricated surface as by being constituted by the surface of a layer of porous bronze impregnated with polytetrafluoroethylene (hereinafter referred to as P.T.F.E.).

In a typical example of the invention the bearing member in which the journal is or will be located is of generally polygonal external cross-section in planes at right angles to the axis of the bearing member, for example, of triangular or square external cross-section, and an intermediate member is interposed between each of its sides and the adjacent side of a bore of corresponding polygonal form within the housing. In such a construction each intermediate member may comprise a member of semi-cylindrical or other segment-shaped cross-section, the part-cylindrical curved bearing surface of which engages a corresponding part-cylindrical bearing surface in the appropriate side of the bore of the housing.

Figure 2:
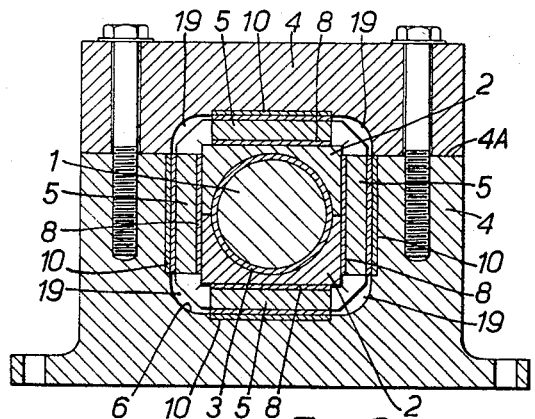
Figure 4:
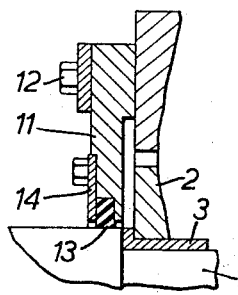
Figure 5:
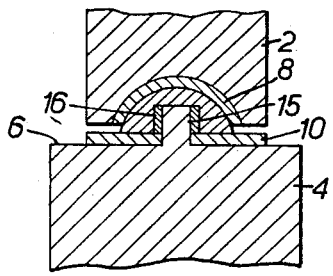
Figure 6:
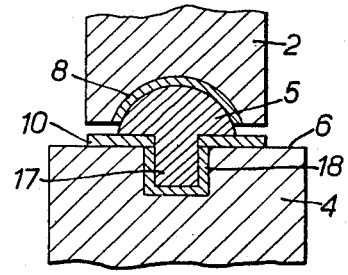
Figure 3:
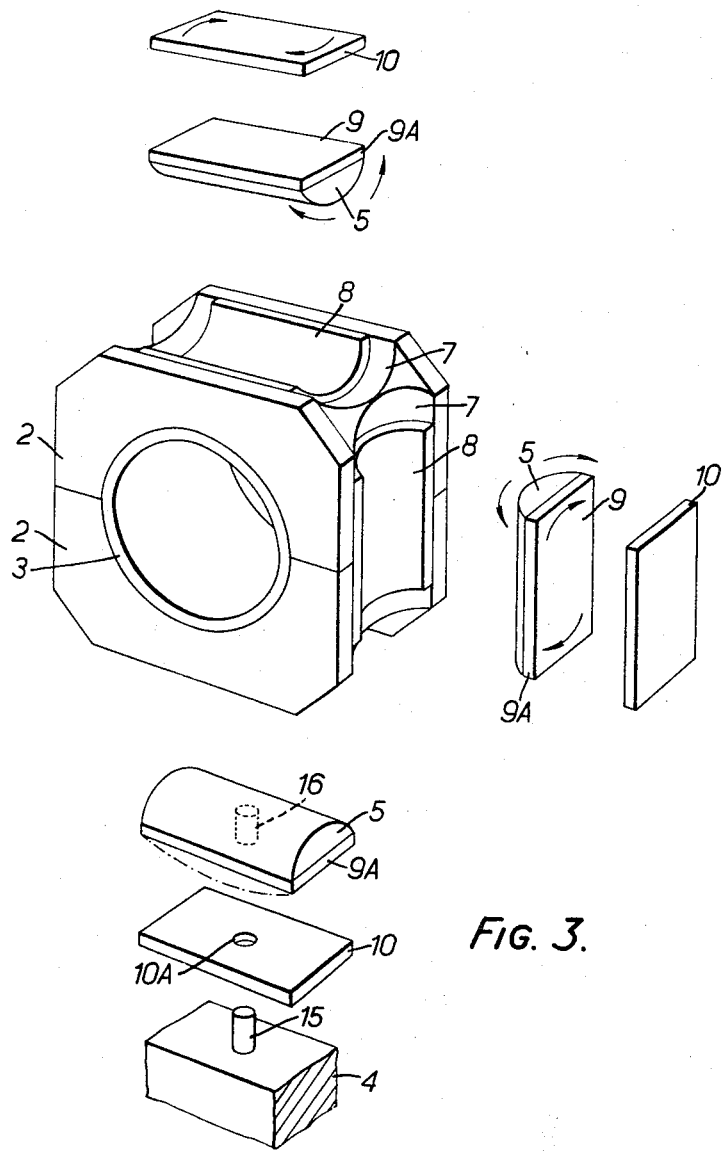
Figure 7:
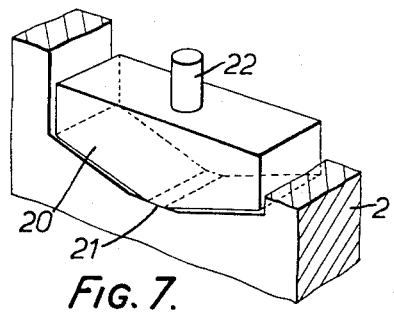
Figure 8:
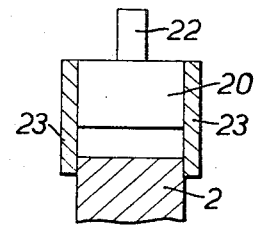
Figure 9:
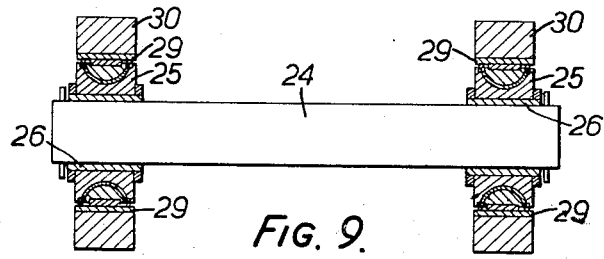
Figure 10:
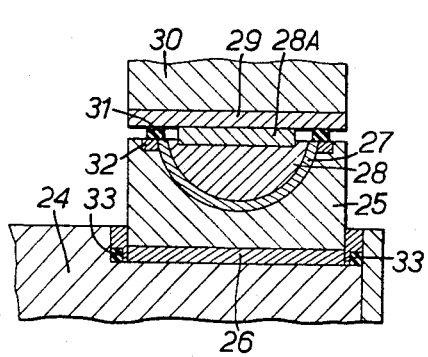
Figure 11:
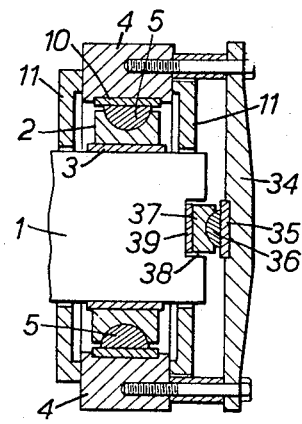

One construction of bearing assembly according to the invention and various modifications are shown by way of example in the accompanying drawings, in which:

FIGURE 1 is a cross-section through one form of bearing assembly according to the invention in a plane containing the axis of the journal member associated with the bearing assembly, FIGURE 2 is a cross-section of the construction shown in FIGURE 1 on the line 2—2 of FIGURE 1, FIGURE 3 is an exploded isometric view on an enlarged scale of parts of the assembly shown in FIGURES 1 and 2, FIGURE 4 is an enlarged partial cross-section in the same plane as FIGURE 1 showing one of the seals employed in FIGURE 1, FIGURE 5 shows in cross-section in the same plane as FIGURE 1 and on an enlarged scale, a modification which may be applied to the construction shown in FIGURES 1 to 4, FIGURE 6 is a similar view to FIGURE 5 showing an alternative to the modification shown in FIGURE 5, FIGURE 7 shows in perspective and on an enlarged scale a further modification which may be applied to the construction shown in FIGURES 1 to 4, FIGURE 8 is a cross-section showing an arrangement of seals which may be employed with the modification shown in FIGURE 7, FIGURE 9 shows in cross-section an arrangement embodying two bearing assemblies according to the invention, the cross-section being in a plane containing the axes of the journal members associated with the bearing assemblies, FIGURE 10 is a partial cross-section in the same plane as FIGURE 9 and on an enlarged scale showing an arrangement of seals which may be employed in the construction shown in FIGURE 9, and FIGURE 11 is a cross-section in the same plane as FIGURE 1 and in an enlarged scale showing a modification of the arrangement shown in FIGURE 1.

In the construction shown in FIGURES 1, 2, 3 and 4 the assembly comprises a cylindrical journal member 1 mounted for rotation in a shell 3 supported in a bearing member 2 formed in two parts as shown, a housing 4 formed in two parts which are clamped together but are capable of being separated on a plane 4A, and four intermediate members indicated generally at 5. As shown the bearing member 2 is of square external cross-section and lies within and is spaced from the surface of an approximately rectangular bore 6 within the housing 4. Formed in each of the four sides of the bearing member 2 is a part cylindrical groove or recess 7 within which is arranged and secured a bearing layer 8 of trough-like form the bearing surface of which may be in the form of a dry lubricated bearing surface, e.g. of porous bronze impregnated with P.T.F.E. Each of the intermediate members comprises a body part 5 to which for convenience the identifying reference numeral 5 has been applied having a part-cylindrical inner bearing surface which may be of stainless steel or chromium or nickel plated and which lies in close sliding engagement with the surface of the layer 8, and a flat outer bearing surface 9 which may be formed as a dry lubricated surface on a strip of bearing material 9A secured to the body part 5. The outer bearing surface 9 is in sliding engagement with the inner surface of an insert 10 located in a groove in the adjacent side of the bore of the housing 4 and formed for example of stainless steel or chromium plated or nickel plated.

Although in the arrangement as above described the part-cylindrical surface of each of the members 5 is of stainless steel or is chromium or nickel plated and is in sliding engagement with the dry lubricated surface of a bearing layer 8 while the flat surface 9 of the part 5 has a dry lubricated surface layer 9A attached to it and in sliding engagement with the stainless steel or chromium or nickel plated surface of an insert 10 in the housing 4, it will readily be understood that the requirements will be fulfilled provided that of each pair of relatively sliding surfaces one surface is of stainless steel or is chromium or nickel plated and the other is a dry lubricated surface. It is desirable in any case that each of the dry lubricated surfaces should be of somewhat less area than the co-operating stainless steel or chromium plated, or nickel plated surface so as to remain in full area contact with the latter surface in spite of small relative movements between the journal 1 and the housing 4.

As indicated in FIGURE 3 the lower horizontal intermediate member 5 is located with respect to the housing 4 by a dowel 15 secured to the housing 4 and passing through an aperture 10A in the part 10 into a cylindrical recess 16 in the body part 5 of the intermediate member. It will be appreciated that only the lowermost intermediate member 5 need be provided with a dowel 15 or the equivalent and moreover that the dowel 15 will serve not only as a location for the intermediate member 5 relatively to the housing 4 but will also serve to provide an axis about which relative angular movement can take place between the surface 9 and the member 10.

Secured to each side of the housing 4 is a sealing assembly comprising an annular plate 11 the outer circumferential portion of which is secured to the housing 4, as for example by bolts 12 while its inner circumferential portion, which bridges the gap between the housing 4 and the bearing member 2, is spaced from the housing and the bearing member as shown and is formed to provide in its inner circumferential surface an annular recess in which is disposed a flexible sealing ring 13 retained in the recess by a plate 14 and engaging the adjacent part of the circumferential surface of the shaft 1. The sealing ring 13 may be formed as shown as a rectangular section member made for example of a suitable resilient solidified foam such as a synthetic rubber foam or alternatively may be of the flexible lip type.

It will thus be seen that the seals prevent the entry of dirt into the space in which all the relatively sliding bearing surfaces lie.

In the modification shown in FIGURE 5 instead of the dowel 15 directly engaging a bore in the associated member 5 a bushing 16, which may be of dry lubricated material, is provided within the bore in the member 5 to provide a bearing for the dowel.

In the modification shown in FIGURE 6 instead of a dowel formed on the housing 4, a dowel 17 is formed on the member 5 and engages a bore in a bearing member 18 located in a bore in the housing 4. Here again the bearing member 18 may be of dry lubricated material.

If desired in the construction shown in FIGURES 1 to 4 end stops may be provided in the spaces 19 formed at the "corners" of the space within the housing 4 in which the bearing assembly lies so as to limit the longitudinal movement of the members 5 which are not provided with dowel pins.

In the modification shown in FIGURE 7 the "side" of the bore of the housing 4 shown is formed to provide a fulcrum for a rocking member 20 as shown at 21 and this member carries a dowel 22, the arrangement being an alternative to that of the parts shown in FIGURE 3. Thus the part 20 replaces the part 10 and itself carries the dowel which engages the recess 16 thus allowing for limited rocking movement of the intermediate member 5 relatively to the housing 2 about the fulcrum 21.

FIGURE 8 shows how flexible seals 23 attached to the member 20 may be applied to the modification shown in FIGURE 7.

In the further construction according to the invention shown in FIGURES 9 and 10 there are two bearing assemblies according to the invention disposed at opposite ends of a shaft 24, each bearing assembly being of somewhat simplified form as compared with that shown in FIGURES 1 to 4 but having the same general characteristics as that bearing assembly. In FIGURES 9 and 10 each bearing assembly comprises a bearing member 25 containing a bushing 26 in which the shaft 24 is rotatably mounted and having a generally rectangular peripheral form with each side of the rectangle provided with a part-cylindrical bearing member 27 having a part-cylindrical bearing surface engaged by a part-cylindrical bearing surface on an intermediate member 28 having a flat outer bearing surface formed by a strip of bearing material 28A which is in sliding engagement with a flat strip of stainless steel or other co-operating bearing material 29 supported by the adjacent side of a rectangular bore in a housing 30. Since the general arrangement and functioning of the intermediate members 28 in this construction is the same as that of the intermediate members 5 in the construction shown in FIGURES 1 to 4 it will not again be described. In the construction shown in FIGURES 9 and 10 there are not any sealing assemblies corresponding to those provided by the plates 11 and their associated parts in FIGURES 1 to 4 but instead individual seals are provided around the bearing surfaces of the intermediate members 28, these seals being in the form of strips of flexible resilient sealing material 31 attached to a support 32 as indicated in FIGURE 10. In addition sealing rings of known type may be provided at the ends of the bushing 26 as shown at 33 in FIGURE 10.

In the modification shown in FIGURE 11, which may be regarded as showing a construction otherwise similar to that shown in FIGURES 1 to 4 but in which for simplicity certain parts have been omitted while the remaining parts are identified by the same reference numerals as the corresponding parts in FIGURES 1 to 4, there is associated with the bearing assembly an anticlastic thrust bearing similar in general form to one of the four individual assemblies between the bearing member 2 and the housing 4 in FIGURE 1. This anticlastic bearing assembly comprises a birder like thrust member 34 secured to the housing 4 and carrying at its centre a flat strip of bearing metal 35, e.g. a dry lubricated material, against which bears the flat face of a part cylindrical intermediate member 36 similar to one of the members 5 in FIGURES 1 to 4 the part-cylindrical surface of the intermediate member 36 being in sliding engagement with a corresponding part-cylindrical bearing surface on one side of a member 37 partly housed within a recess 38 in the adjacent end of the shaft 1. The base of the recess 38 and the opposite side of the member 37 to the member 36 are flat and there is interposed between the member 37 and the base of the recess a strip 39 of bearing material with which the flat face of the member 39 is in sliding engagement.

It will be seen that the anticlastic bearing assembly is thus capable of transmitting end thrust from the shaft 1 to the housing 4 while allowing for tilting movement of the axis of the shaft 1 relatively to the housing 4.

What I claim as my invention and desire to secure by Letters Patent is:

1. A journal bearing assembly comprising a bearing member having an inner bearing surface formed for engagement by the bearing surface of a journal member and a plurality of outer bearing surfaces, a housing surrounding but spaced from the bearing member and having a plurality of inner bearing surfaces lying respectively opposite the outer bearing surfaces on the bearing member, and a plurality of intermediate devices arranged around the bearing member and interposed between and having bearing surfaces in sliding engagement respectively with the outer bearing surfaces on the bearing member and the inner bearing surfaces on the housing capable of independently bodily sliding to permit limited angular movement of the axis of the bearing member relatively to the housing while the journal is turning, while substantially completely locating the bearing member.

2. A journal bearing assembly as claimed in claim 1, in which one of the bearing surfaces of each of the intermediate devices is of arcuate cross-section in planes containing the axis of the bearing member.

3. A journal bearing assembly as claimed in claim 2, in which the other bearing surface of each of the intermediate devices is flat.

4. A journal bearing assembly as claimed in claim 1 in which at least one of the pairs of bearing surfaces which have relative sliding movement includes a bearing surface of a material providing a dry lubricated surface.

5. A journal bearing assembly comprising a bearing member having an inner bearing surface formed for engagement by the bearing surface of a journal member and a plurality of outer bearing surfaces; a housing surrounding but spaced from the bearing member and having a plurality of inner bearing surfaces lying respectively opposite the outer bearing surfaces on the bearing member; and a plurality of intermediate devices interposed between and having bearing surfaces in sliding engagement respectively with the outer bearing surfaces on the bearing member and the inner bearing surfaces on the housing permitting limited angular movement of the axis of the bearing member relative to the housing in which the bearing member is of generally polygonal external cross-section in planes at right angles to the axis of the bearing member, the bore of the housing is of corresponding polygonal cross-section in said planes and one of said intermediate devices is interposed between each of the sides of the bearing member and the adjacent side of the housing.

6. A journal bearing assembly as claimed in claim 5 in which one of the bearing surfaces of each of the intermediate devices is of arcuate cross-section in planes containing the axis of the bearing member and the other bearing surface of each of the intermediate devices is flat in said planes.

7. A journal bearing assembly as claimed in claim 6 in which each intermediate device comprises a member of semi-cylindrical or other segment-shaped cross-section, the part-cylindrical curved bearing surface of which engages a corresponding part-cylindrical bearing surface on the appropriate side of the bearing member while its flat bearing surface engages a flat bearing surface on the adjacent side of the bore of the housing.

8. A journal bearing assembly as claimed in claim 6 in which at least one of the pairs of bearing surfaces which have relative sliding movement includes a bearing surface of a material providing a dry lubricated surface.

References Cited
UNITED STATES PATENTS

| | | | |
|---|---|---|---|
| 1,490,173 | 4/1924 | Kando | 308—66 |
| 2,741,516 | 4/1956 | Van Deventer | 308—240 X |
| 2,863,706 | 12/1958 | Duncan | 308—72 |
| 3,268,983 | 8/1966 | Straub | 308—72 X |

FREDERICK L. MATTESON, Jr. *Primary Examiner.*

R. A. DUA, *Assistant Examiner.*